Jan. 31, 1933.        C. M. ANGLEMYER        1,895,600
FRICTION CLUTCH
Filed May 28, 1928
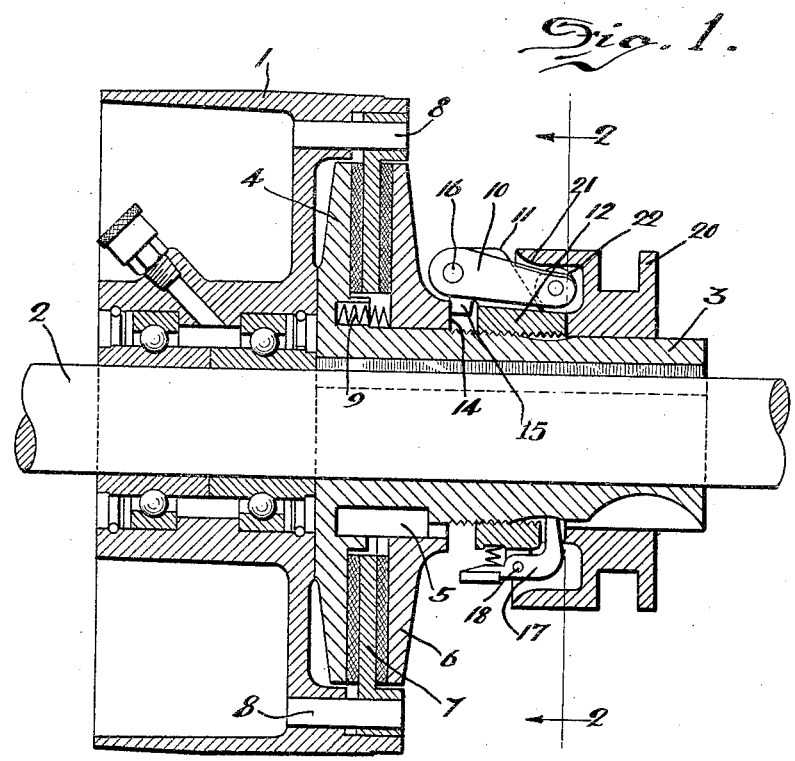
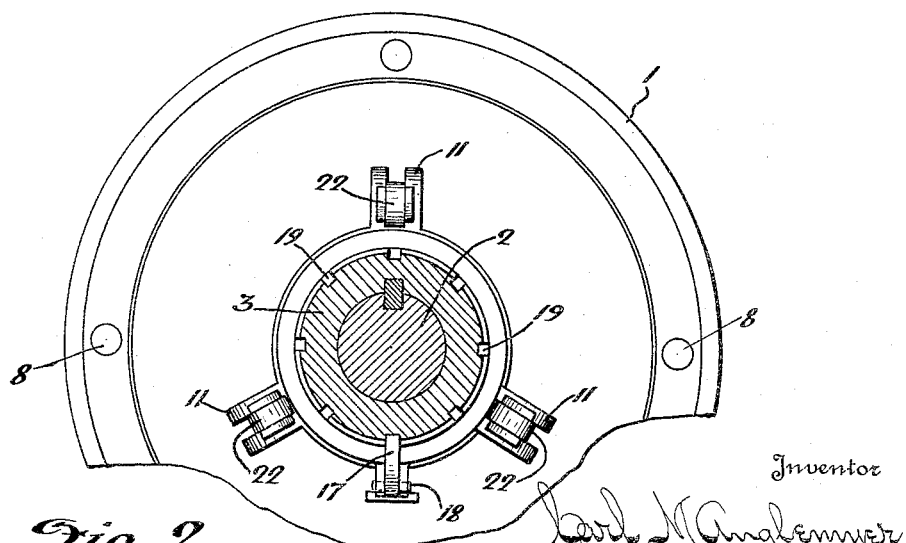

Patented Jan. 31, 1933

1,895,600

UNITED STATES PATENT OFFICE

CARL M. ANGLEMYER, OF DAYTON, OHIO, ASSIGNOR TO THE EDGEMONT MACHINE COMPANY, OF DAYTON, OHIO, A CORPORATION OF OHIO

FRICTION CLUTCH

Application filed May 28, 1928. Serial No. 281,043.

My invention relates to friction clutches of the disc or clamp ring type and more particularly to the means for adjusting the frictional coupling members whereby the coupling pressure may be directly applied with minimum lost motion and rubbing action and to provide means for adjusting the operating devices to compensate for wear and maintain them in relation for most efficient operation.

In the present construction one of the clutch members is provided with an axially movable friction disc having a bearing face engaged by several oscillatory actuating levers. These levers are pivoted in an adjustable mounting ring so positioned that the pivotal axes of the levers lie substantially in the plane of the bearing face of the disc, whereby the engaging points of the levers with such bearing face move substantially parallel with the axis of rotation of the clutch members through a very limited range to and fro across the plane in which the pivotal points of the actuating levers lie. This insures a direct pressure in an axial direction with minimum rubbing or wiping motion. In order that the pivotal axes of the levers may be maintained substantially in a plane common with the bearing face of the disc the mounting ring of said levers is screw-threaded upon a supporting hub provided at spaced intervals with grooved recesses in which engages a spring actuated detent upon the mounting ring to maintain the ring in its adjusted position.

The object of the invention is to simplify the structure as well as the means and mode of operation of such friction clutches, whereby they will not only be economical in construction, but will be more efficient in use, positive in operation, uniform in action, easily operated and unlikely to get out of repair.

A further object of the invention is to provide an improved construction, wherein the actuating levers exert their pressure directly upon the friction disc in an axial direction with minimum friction between the levers and the disc.

A further object of the invention is to provide a construction wherein the actuating levers are pivoted substantially in the plane of the bearing surface of the disc with their bearing points directed inwardly intermediate their pivotal bearings and the axis of rotation of the clutch, whereby a more efficient action of the levers may be achieved.

A further object of the invention is to provide improved adjustment means for varying the frictional engagement of the clutch members and to compensate for wear.

With the above primary and other incidental objects in view, as will more fully appear in the specification, the invention consists of the features of construction, the parts and combinations thereof and the mode of operation, or their equivalents, as hereinafter described and set forth in the claims.

Referring to the accompanying drawing, wherein is shown the preferred, but obviously not necessarily the only form of embodiment of the invention, Fig. 1 is a vertical sectional view of the assembled clutch mechanism in which the present invention has been embodied. Fig. 2 is a side elevation of the clutch mechanism shown in Fig. 1 viewed from the right, the central portion being upon a section 2—2 of Fig. 1.

Like parts are indicated by similar characters of reference throughout the several views.

While the present clutch mechanism may be employed for connecting for unison rotation two aligned portions of a shaft or may be embodied as a part of a mechanism or machine to be intermittently driven for illustrative purposes, the clutch mechanism has been shown embodied in a pulley wheel 1 loosely journalled upon a shaft 2 by means of ball bearings, whereby the shaft and pulley are capable of independent rotation. Either may be the driving and the other the driven member. Keyed or otherwise secured upon the shaft 2 is a sleeve or elongated hub 3 having at its end adjacent to the pulley 1 an integral disc 4. Slidingly adjustable in an axial direction upon the sleeve or hub 3 but secured thereto by the key 5 for unison rotation is the second disc 6. Interposed between the discs 4 and 6, is a friction ring 7 carried by the pulley member 1, with which it is engaged for unison rotation, but is permitted limited axial movement, upon studs or pins 8. The clamping engagement of the friction ring 7 between the discs 4 and 6 serves to operatively couple the driving and driven members for unison rotation. Springs 9 located at spaced intervals tend to separate the clamp discs 4 and 6 and so release the friction ring 7.

This construction illustrates a more or less common type of friction clutch and forms no part per se of the present invention.

In order to axially move the clamp disc 6 against the resistance of the springs 9 into frictional engagement with the ring 7 a plurality of oscillatory operating levers are provided in positions spaced circumferentially about the axis of the shaft 2. These actuating levers 10 are pivotally mounted in ears 11 carried by an adjustable mounting ring 12 screw threaded upon the hub or sleeve 3.

The clamp disc 6 is formed with a laterally projecting hub terminating in a bearing face 14 perpendicular to the axis of rotation. The oscillatory operating levers 10 are provided with pressure shoulders 15 located in lateral alignment with the centers 16 of oscillation of the levers or approximately at right angles to the general axis of the levers 10. The mounting ring 12 is so adjusted upon the supporting hub or sleeve 3 that the pivotal axes 16 of the operating levers 10 are approximately in the plane of the bearing face 14 of the disc 6. The relation is such that as the operating levers 10 are oscillated to and fro the bearing shoulders 15 of such levers engaging the bearing face 14 of the disc pass to and fro across dead center relation with the pivotal axes 16. The range of movement of the disc 6, is quite limited so that in effect the engagement point between the lever and the disc is in a direction substantially parallel with the axis of rotation of the clutch. In this to and fro movement the direction of pressure is perpendicular to the plane of the disc 6 and the pressure shoulder 15 exerts a direct thrust pressure upon the bearing face 14 of the disc moving the disc into an engagement with the friction ring 7 against the tension of the springs 9 without rubbing or wiping action between the shoulder 15 and the bearing face 14.

By so arranging the bearing points of the operating levers with the disc substantially in the plane of the pivotal axes of the levers it affords a quick uniform action with minimum effort.

In order to maintain the axis of oscillation of the levers 10 in approximately the plane of the bearing face 14 the ring 12 is screw threaded upon the hub 3, whereby it may be adjusted to take up lost motion and compensate for wear. To maintain the mounting ring 12 in its adjusted position, there is provided upon such ring a spring actuated detent 17 pivoted at 18. The end of this detent 17 is engageable in any one of a series of longitudinally disposed grooves 19 in the peripheral surface of the hub or sleeve 3. By retracting the detent 17 against the tension of its spring, thereby withdrawing it from one of the grooves 19 of the sleeve or hub 3 the ring 12 may be revolubly adjusted upon the sleeve or hub 3 with which it has screw-threaded engagement until the plane of the axes of oscillation of the levers 10 is brought into approximately the plane of the bearing face 14 of the disc whereupon the detent 17 is re-engaged with one of the longitudinal grooves 19 of the hub or sleeve 3 to maintain the mounting sleeve in its adjusted position.

The operating levers 10 are operated in unison by a shift collar 20 having a cam flange 21 engaging anti-friction rollers 22 in the free ends of the operating levers.

From the above description it will be apparent that there is thus provided a construction of the character described, possessing the particular features of advantage before enumerated as desirable, but which obviously is susceptible of modification in its form, proportions and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a friction clutch driving and driven members including an axially movable clamp disc, oscillatory actuating levers for shifting said axially movable disc, an axially adjustable mounting for said levers, the pivotal axes of the levers being located outwardly a greater distance from the axis of rotation of the clutch than the points of engagement of said levers with the disc, both the pivotal points and the engagement points of the levers being approximately in a common plane perpendicular to the axis of rotation of the clutch.

2. In a friction clutch, driving and driven members, frictional means for interengaging the members for unison rotation, and operating means therefor including a pressure lever disposed substantially parallel with the axis of rotation, a mounting therefor in which the lever is pivoted, means for oscillating the lever and a pressure shoulder on the lever located inwardly toward the axis of rotation of the clutch in relation with the pivotal point of the lever and positioned substantially opposite the pivotal center of the lever in a direction substantially perpendicular to the general axis of the lever and means for adjusting the lever relative to the frictional engaging means independently of its oscillation about its pivotal connections.

3. In a friction clutch, driving and driven members, frictional means for interengaging the members for unison rotation, and adjusting means for the interengaging means, including a series of oscillatory levers, a support to which said levers are pivoted, said levers having operative engagement with the frictional engaging means at points inwardly disposed between their pivotal connections with said support, and the axis of rotation of the clutch.

In testimony whereof, I have hereunto set my hand this 3rd day of May A. D. 1928.

CARL M. ANGLEMYER.